E. E. BECHTOLD.
CANOPY INSULATOR.
APPLICATION FILED OCT. 27, 1913.
1,111,820.
Patented Sept. 29, 1914.
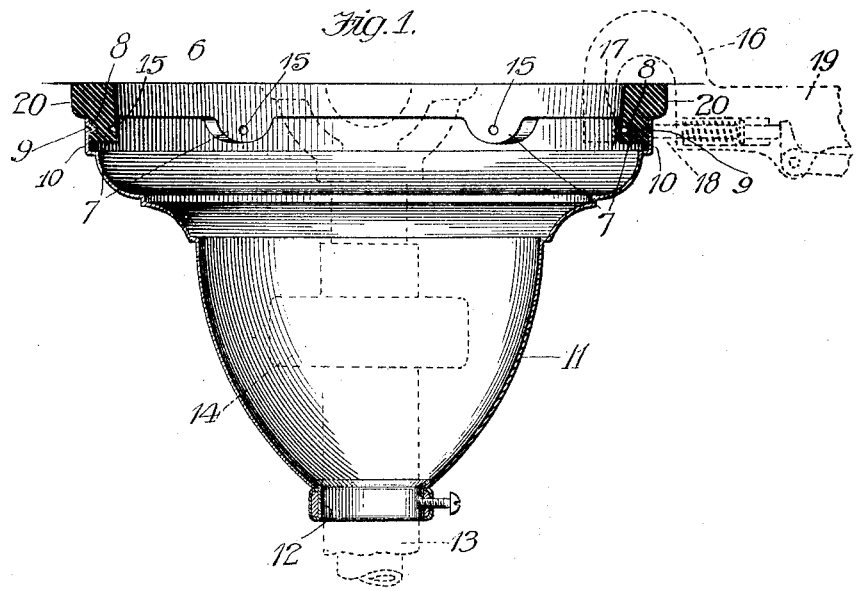
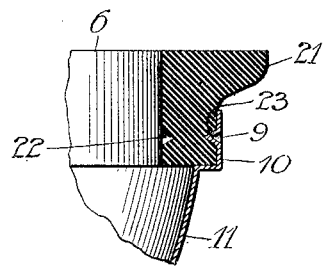
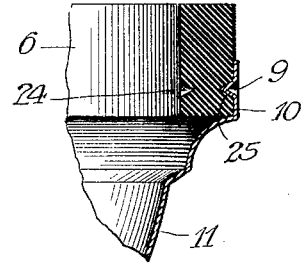
Witnesses
Martin H. Olsen.
A. S. Phillips
Inventor
Edmund E. Bechtold
By Chas. C. Tillman
Atty.

UNITED STATES PATENT OFFICE.

EDMUND E. BECHTOLD, OF CHICAGO, ILLINOIS.

CANOPY-INSULATOR.

1,111,820.  Specification of Letters Patent.  Patented Sept. 29, 1914.

Application filed October 27, 1913.  Serial No. 797,391.

*To all whom it may concern:*

Be it known that I, EDMUND E. BECHTOLD, a citizen of the United States, residing at Chicago, in the county of Cook and State of Illinois, have invented certain new and useful Improvements in Canopy-Insulators, of which the following is a specification.

My present invention has relation to improvements in insulation for electric light fixtures, such as those used for the support of electric lamps, as well as, combination-fixtures, that is, fixtures which may be used for electric or gas lighting.

In the above named type of fixtures, a supporting-pipe extended from the ceiling, wall or other support, is employed, and a canopy or housing usually of an ornamental design, is used to inclose and conceal the ordinary insulating joint in said pipe, which joint is located close to the ceiling, wall or support. This canopy is fastened at its outer portion to the pipe which it surrounds, by a set-screw seated in the canopy, and has interposed between its inner portion and the support a piece of insulating material which is held in its place thereby as long as the set-screw firmly engages the pipe, but owing to vibrations and other causes, this screw frequently becomes loose, thus permitting movement of the canopy from the support and the displacement of the interposed insulating ring or piece, when it is apparent, the metallic canopy may come in contact with the support and cause grounding of the current, should leakage thereof at the said joint occur. This is more likely to happen when the fixture is extended from a vertical support, but it sometimes occurs when the fixture is mounted on the ceiling or a horizontal support.

The principal object of the invention is to provide insulation which may be quickly, readily and firmly secured to a canopy or other device to be insulated, without the use of rivets or brads, and in such a manner that the canopy or device can be placed and maintained in position on its support with absolute security against grounding the electric circuit.

A further object of the invention is to provide a canopy insulator which shall be of such construction that, when attached to the canopy it will form substantially an integral part thereof, or, in other words, will be so connected thereto that neither part can be moved in any direction independently of the other.

Other objects and advantages of the invention will be disclosed in the following description and explanation.

In the accompanying drawings, which serve to illustrate the invention, Figure 1 is a central vertical sectional view of a canopy and its insulator, showing the manner of connecting them together and illustrating the insulator as being applied to a horizontal support, and Figs. 2 and 3 are fragmental sectional views illustrating modifications in the construction of the insulator.

Like numerals of reference refer to corresponding parts throughout the different views of the drawing.

The reference numeral 6 designates a ring, which may be made of fiber or any other suitable insulating material, and of any desired size. In the form shown in Fig. 1 of the drawing, this ring is provided on its lower surface with a series of depending projections 7, each of which is provided on its outer surface with an indentation 8, to receive an indentation or inward projection 9 formed in the upper portion or encircling part 10, of the canopy 11, which is made of metal, and may be of any suitable size and shape, but by preference substantially bell-shaped, as shown in Fig. 1 of the drawing. The smaller end of the canopy 11 is provided with an opening 12, to receive a supporting pipe 13, which is provided with an insulating joint 14, of the ordinary or any preferred construction, which is inclosed by the canopy. Each of the projections 7, on the ring 6 is preferably provided on its inner surface with an indentation or recess 15, in register with the indentation 8, on the outer surface of the projection. While the indentations 15, on the inner surface of each of the projections 7, are not absolutely essential, yet I prefer to provide them in order to act as a guide for a clamping device 16, which I may use in forming the inward projections or indentations 9, on the upper portion 10, of the canopy. As shown in Fig. 1 this clamping device consists of an inverted U-shaped member having on one of its jaws or extensions a pin 17, to fit in one of the depressions 15, when the device is in the position for forming the projection 9, to fit in the indentation 8, of one of the projections 7, as will be readily understood by reference to Fig. 1. The indentation or projection 9, is formed by a pointed rod 18, carried by the handle 19, of the clamping device.

By reference to Fig. 1, it will be seen that the ring 6, is provided with an annular enlargement 20, which overhangs the projections 7, and that the lower portion of said enlargement is located at a right angle to the outer surface of said projections, so that when the canopy is placed around the projections 7, the upper edge of the canopy will abut against the lower edge of the portion 20 of the ring.

The modified form shown in Fig. 2 consists of a ring 6, having its outer surface provided with an O. G. shaped portion 21, extended entirely around the ring. In this modified form the projections 7, are omitted, but at suitable points on its inner and outer surface the lower portion of the ring 6, is provided with indentations 22 and 23 respectively, which are arranged in registering pairs for the same purpose as the indentations 15 and 8 of the construction shown in Fig. 1, and above described.

In Fig. 3 is shown another modified form of the insulator, which consists of a ring 6, which has its inner and outer surfaces in parallelism and provided on its inner and outer surfaces with indentations 24 and 25, which are also arranged in registering pairs at suitable points on the ring.

When either of the modified forms shown in Figs. 2 and 3 is employed, it is obvious that a clamping device 16, may be used for forming the inwardly extended projections 9, on the upper or encircling portion 10, of the canopy, and that as the pin 17 of the clamping device, when the same is being used, will fit in one of the depressions or indentations 22 or 24, on the inner surface of the ring 6, it will cause the pointed rod 18, to aline with said pin, to the end that when said rod is forced inwardly a portion of the canopy will be bent or forced into one of the indentations 23 or 25 on the outer surface of the insulating ring, thus firmly securing the canopy to the same.

Having thus fully described my invention, what I claim and desire to secure by Letters Patent, is—

1. In a canopy insulator, the combination with a support, of a canopy and a continuous flexible insulating member located between the canopy and support and fitted within the former and having an indentation on its outer portion into which a portion of the canopy may be forced.

2. In a canopy insulator, the combination with a support, of a canopy, and a continuous flexible insulating member located between the canopy and support and fitted within the former and having a plurality of indentations on its outer surface into which portions of the canopy may be forced.

EDMUND E. BECHTOLD.

Witnesses:
CHAS. C. TILLMAN,
A. S. PHILLIPS.

---

Copies of this patent may be obtained for five cents each, by addressing the "Commissioner of Patents, Washington, D. C."